April 12, 1966  K. FÄDLER  3,245,229

SHOCK ABSORBING COUPLING DISK ASSEMBLY

Filed Dec. 3, 1963  2 Sheets-Sheet 1

INVENTOR
Kurt Fädler

April 12, 1966  K. FÄDLER  3,245,229
SHOCK ABSORBING COUPLING DISK ASSEMBLY
Filed Dec. 3, 1963  2 Sheets-Sheet 2
FIG. 3
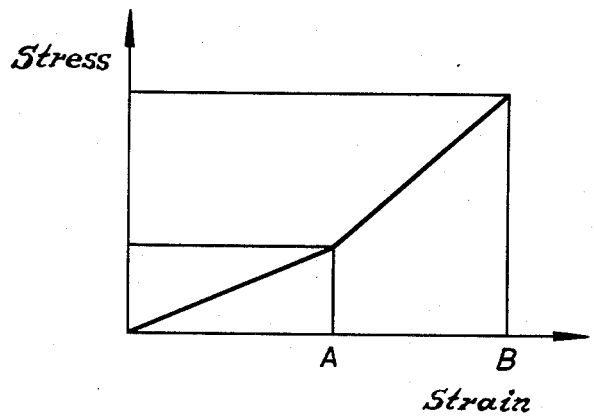
FIG. 4  FIG. 5
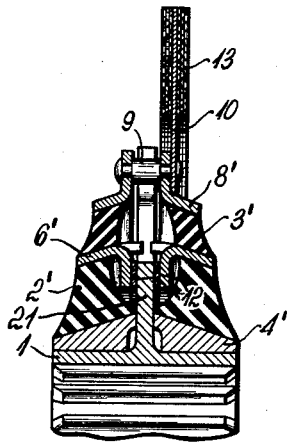 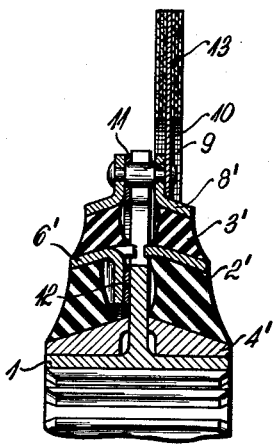
FIG. 6
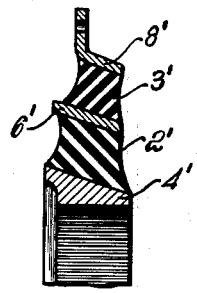
INVENTOR
Kurt Fädler United States Patent Office 3,245,229
Patented Apr. 12, 1966

3,245,229
SHOCK ABSORBING COUPLING DISK ASSEMBLY
Kurt Fädler, Schweinfurt (Main), Germany, assignor to Fichtel & Sachs A.G., Schweinfurt (Main), Germany, a corporation of Germany
Filed Dec. 3, 1963, Ser. No. 327,607
Claims priority, application Germany, Dec. 5, 1962, F 38,463
1 Claim. (Cl. 64—27)

This invention relates to couplings, more specifically automotive couplings or clutches, and is more particularly concerned with a shock absorbing coupling disk assembly.

The basically known type of coupling disk assembly with the improvement of which this invention is concerned consists of a hub portion, a friction disk portion, and an interposed shock absorber portion. The shock absorber portion includes annular or disk-shaped rubber elements which are subjected to shear stresses when the hub portion and the friction disk portion are angularly displaced relative to each other about the common axis. When correctly designed, the known coupling disk assemblies permit relatively great angular displacement of hub and disk portion. Their characteristic of responding to angular stresses by relatively large angular displacement is advantageous for the damping of transmission-generated noise. Large displacement angles, however, cannot be built into a conventional coupling disk assembly without either making the structure relatively complex and/or without sacrificing structural strength.

The primary object of the invention is the provision of a shock absorbing coupling disk assembly which fully provides the advantages of the afore-described known devices while avoiding their inherent shortcomings.

A more specific object is the provision of a shock absorbing coupling disk assembly which is simple, rugged, and capable of being built at low cost.

Another object is the provision of such an assembly which is capable of being installed where only limited space is available, as on a motorcycle or a bicycle equipped with an auxiliary motor.

With these and other objects in view, the coupling disk assembly of the invention in one of its aspects consists of a hub member, a coaxial annular disk, normally covered with a friction facing, and an interposed shock absorber. The hub and friction disk may interchangeably constitute the input and output portions of the disk assembly. The shock absorber includes a plurality of coaxial ring members of elastomeric material, such as natural or synthetic rubber, or a suitable grade of plastics. The resilient ring members are juxtaposed in radial alignment. The radially inner circumferential face of the innermost ring member is secured on the hub member against rotation about the common axis, and the outer face of the outermost ring member is similarly secured on the disk member. The other circumferential faces of the resilient ring members are fixedly fastened to respective radially adjacent ring members.

Other features and many of the attendant advantages of this invention will be readily appreciated as the same becomes better understood by reference to the following detailed description when considered in connection with the accompanying drawings wherein:

FIG. 3 is a stress-strain diagram of the coupling disk assembly of FIG. 1 in arbitrary, but consistent torsional units;

FIG. 4 shows a portion of a modified disk assembly of the invention in axial section;

FIG. 5 illustrates another modification of the disk assembly in an axially sectional view; and FIG. 6 shows a common resilient element of the devices of FIGS. 4 and 5 in the disassembled, relaxed condition.

Figure 1:
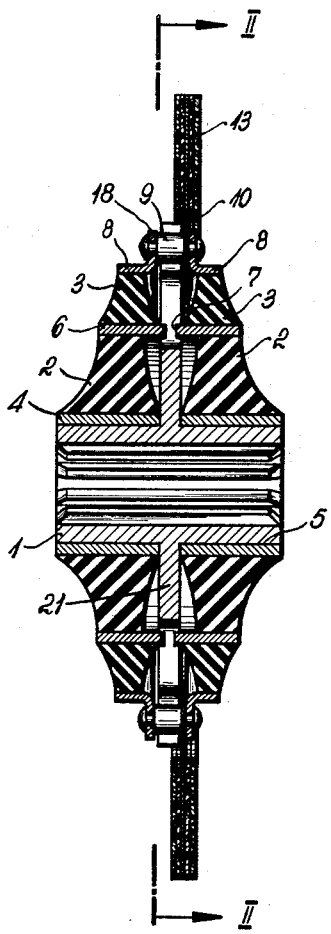
FIG. 1 shows a coupling disk assembly of the invention in axial section on the line I—I in FIG. 2.
Figure 2:
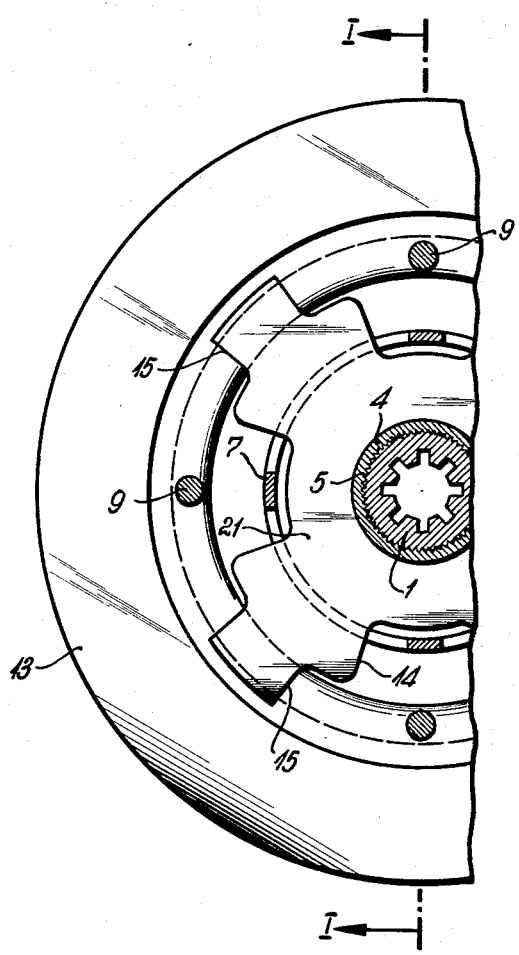
FIG. 2 is a radially sectional view of the apparatus of FIG. 1 taken on the line II—II.

Referring now to the drawing in detail, and initially to FIGS. 1 and 2, there is seen a tubular hub 1 internally splined for seating on a conforming shaft. The hub has an integral flange 21 which extends in a plane axially bisecting the hub 1. The generally cylindrical faces of the hub 1 on either side of the flange 21 are toothed or knurled, and the projections 5 on the hub faces conformingly engage recesses on respective inner circumferential faces of rigid metal rings 4 of generally cylindrical tubular shape.

The outer face of each ring 4 has a substantially conical rubber ring 2 integrally bonded thereto, as by vulcanization. The narrower outer circumferential faces of the rubber rings 2 are bonded to metal rings 6, similar to the rings 4, but axially narrower. The metal rings 6 carry two conical rubber rings 3 whose circumferential faces are respectively bonded to the rings 6 and to outermost metal rings 8, axially narrower than the rings 6. The radial height of the rubber rings 3 is smaller than that of the rubber rings 2.

As best seen in FIG. 2, the flange 21 has four circumferentially distributed radial notches whose radial side walls are stepped. The inner side wall portions 14 form angularly spaced abutments which cooperate with integral axial projections 7 on the rings 6 to limit rotary movement of the rings relative to the hub 1. The outer side wall portions 15 are further spaced from each other than the corresponding inner wall portions 14, and serve as abutments for shoulder pins 9 which fixedly connect respective integral flanges 18 on the two rings 8, and limit rotary movement of the rings 8 about the hub 1.

A friction disk 10 which is equipped with friction facings 13 is attached to the connected rings 8 by means of the pins 9.

In building the coupling disk assembly, the hub 1 is made of harder metal than the rings 4. A ring 4 originally having a cylindrical inner face of a diameter smaller than the overall outer diameter of the hub 1 is vulcanized to a rubber ring 2 which is also attached in the same manner to a metal ring 6, a rubber ring 3, and yet another metal ring 8. The stack of vulcanized coaxial metal and rubber rings is then axially forced over the corresponding portion of the hub 1 and against the flange 21, whereby the inner metal ring 4 is conformingly locked to the hub surface. The outermost metal rings 8 are connected with each other and with the friction disk 10 by the shoulder pins 9, and the free ends of the pins are upset to form heads and to secure the assembly.

The characteristic stress-strain curve of a shock absorbing assembly of the invention is shown in FIG. 3. The stress in arbitrary units of torque is plotted as the ordinate value against the strain in units of angular displacement of the hub 1 relative to the friction disk 10 in the direction of the abscissa. The relationship between stress and strain is approximately linear up to an angular displacement A when the projections 7 abut against the radial notch walls. Because of the difference in cross section between the rings 2 and 3, the deformation of the shock absorber structure is concentrated in the rings 2 up to this point.

Further angular displacement of the hub 1 and of the disk 10 is opposed by the narrower rings 3 which require a greater increase in torque for equal rotation than the rings 2. The second portion of the characteristic from A to B is steeper than the first portion. The desirable difference in slope may be further enhanced by employing rubber of different stiffness for the rings 2 and 3, and by differentially prestressing the rings prior to or during assembly.

In the embodiments of the invention illustrated in FIGS. 4 and 5, the stress-strain characteristic of the shock absorbing unit is modified by frictional engagement between the resiliently mounted metal rings with the hub 1.

The modified vulcanized metal-rubber shock absorber units which are employed in the assemblies illustrated in FIGS. 4 and 5 are shown in FIG. 6 in the relaxed condition. Each unit consists of a ring 4' whose inner face is cylindrical, and whose outer face is conical. Whereas the flanges 18 shown in FIG. 1 are perpendicular to the cylindrical portions of the rings 8 from which they project in a radial direction, the corresponding flanges of the ring 8' are obliquely inclined relative to the rings. All circumferential faces of the rubber rings 2', 3' are conical.

When the unit shown in FIG. 6 is mounted on a hub 1 by forcing the metal ring 4' into axial abutting engagement with the flange 21, the two rings 8' are axially spaced apart a distance much greater than that bridged by the pins 9. When the pins are inserted and fixed, the intermediate metal rings 6' are urged toward the flange 21 by the resilience of the deformed rubber rings 2', 3'.

The portions of the metal rings 6', or of the rings 6' and 8' not visible in FIG. 6 are equipped with friction elements. As seen in FIG. 4, friction elements 12 are mounted on integral lugs of the rings 6' and are circumferentially aligned so that they engage the same portion of the flange 21 from opposite sides under the force of the associated rubber rings. As shown in FIG. 5, the friction elements are provided on only one of the rings 6', and friction elements 11 are mounted on selected lugs of the rings 8' to engage the flange 21, and to affect the damping characteristic of the shock absorber unit, particularly in a phase of operation corresponding to the portion of FIG. 3 between A and B.

The friction elements 11, 12 have a similar effect on the shock absorber characteristic of the assembly as an increased initial resilient stress in the elastic rings 2', 3'. They primarily affect the damping characteristics of the assembly.

The shock absorbing coupling disk assemblies of the invention are very small, yet they have a desirable soft spring characteristic at a small angular displacement of the coupled devices, and good damping is achieved. At greater angular displacement, the response may be made as hard as desired by selecting the dimensions of the several elastomeric rings, by selecting their resiliency, and by differentially prestressing them. It will be appreciated that the hub 1 and the friction disk 10 move as a unit when the shoulder pins 9 abut against the radial wall portions 14. This condition is represented in the graph of FIG. 3 at B. Any increase in stress beyond that corresponding to B cannot produce further angular displacement. From B, the characteristic of the assembly is parallel to the ordinate.

Precisely reproducible pre-stressing of the resilient shock absorber elements is assured by the modification of the invention illustrated in FIGS. 4 to 6. The slope of the conical circumferential faces of the rings 2', 3' in the relaxed condition determines the pre-stressing of the assembled resilient rings.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claim.

What is claimed is:

A coupling disk assembly comprising, in combination:
(a) a hub member having an axis;
(b) an annular disk coaxial with said hub member and radially spaced therefrom, said disk having a radially extending face;
(c) a friction facing on said face;
(d) a flange fixedly fastened on said hub member intermediate the axial ends thereof and radially projecting therefrom toward said disk;
(e) two sleeve means coaxially fastened on said hub on opposite axial sides of said flange, each sleeve means having an outer circumferential face conically tapering in a direction away from said flange;
(f) two first rings of resilient material having respective inner circumferential faces conformingly engaging the respective outer faces of said sleeve means, and fixedly fastened thereto, each of said rings having an outer conical circumferential face tapering in an axial direction away from said flange;
(g) two first rings of substantially rigid material having respective inner conical circumferential faces fixedly fastened to said outer faces of the rings of resilient material in conforming engagement, and respective outer conical circumferential faces;
(h) two axially spaced second rings of substantially rigid material, each of said second rings being radially approximately aligned with a respective sleeve means and rings of said resilient and rigid materials, and having an inner circumferential face conically tapering in a direction away from said flange;
(i) two second rings of resilient material, each of the last-mentioned second rings being interposed between and fastened to the inner face of one of said second rings of rigid material and the outer face of the aligned first ring of rigid material;
(j) a friction element fixedly fastened to one of said rings of rigid material and axially interposed between said flange and one of said rings of resilient material;
(k) abutment means fastened on each of said rings of rigid material and projecting therefrom toward said flange,
(1) the flange having a plurality of pairs of radially extending circumferentially spaced walls, respective abutment means being circumferentially interposed between the walls of each pair for limiting relative rotary movement of said rings of rigid material and of said hub, the circumferential angular spacing of the walls having the abutment means on said second rings of rigid material interposed therebetween being substantially greater than the circumferential angular spacing of the walls having the abutment means of said first rings of rigid material interposed therebetween,
(2) the cross sectional area of said first rings of resilient material being substantially greater than the cross sectional area of said second rings of resilient material, and (3) the abutment means on said second rings of rigid material including a fastening member axially fixedly connecting said second rings of rigid material in such axial relationship that the friction element on said one ring of rigid material abuttingly engages said flange, said fastening member also engaging said disk for fixedly fastening the same to said two second rings of rigid material.

References Cited by the Examiner

UNITED STATES PATENTS

| | | | |
|---|---|---|---|
| 2,187,706 | 1/1940 | Julien | 64—11 |
| 2,927,674 | 3/1960 | Everitt | 64—11 X |
| 3,023,593 | 3/1962 | Nallinger | 64—11 X |

FOREIGN PATENTS

| | | |
|---|---|---|
| 1,267,022 | 6/1961 | France. |
| 532,393 | 1/1941 | Great Britain. |
| 837,659 | 6/1960 | Great Britain. |
| 543,795 | 5/1956 | Italy. |

OTHER REFERENCES

Jorn: German printed application No. DAS 1,021,213, Pub. 12-19-57, Class 64-11.

Jorn et al.: German printed application No. DAS 1,026,135, Pub. 3-13-58, Class 64-27 (R).

BROUGHTON G. DURHAM, *Primary Examiner.*

D. H. THIEL, *Assistant Examiner.*